United States Patent [19]

Sogo et al.

[11] 4,257,786

[45] Mar. 24, 1981

[54] CYCLONE SEPARATOR

[75] Inventors: Yukio Sogo, Atsugi; Kazuo Ido, Hino; Kozo Taneda, Kodaira; Katzuji Sakai, Chiba; Yoichiro Sato, Matsudo, all of Japan

[73] Assignee: Snow Brand Milk Products Co., Ltd., Hokkaido, Japan

[21] Appl. No.: 69,167

[22] Filed: Aug. 23, 1979

[30] Foreign Application Priority Data

Aug. 28, 1978 [JP] Japan .......................... 53/117528[U]

[51] Int. Cl.[3] .............................................. B01D 45/12

[52] U.S. Cl. ........................................ 55/261; 55/339; 55/392; 55/414; 55/424; 55/459 R; 209/144

[58] Field of Search ................. 55/261, 339, 392, 413, 55/414, 424, 459 R; 209/144

[56] References Cited

U.S. PATENT DOCUMENTS

| | | | |
|---|---|---|---|
| 1,464,113 | 8/1923 | Ryding | 55/261 |
| 2,153,270 | 4/1939 | Osgood | 55/339 |
| 2,252,581 | 8/1941 | Saint-Jacques | 55/459 R |
| 3,283,480 | 11/1966 | Szego | 209/144 |
| 4,149,861 | 4/1979 | Sogo et al. | 55/261 |

FOREIGN PATENT DOCUMENTS

| | | | |
|---|---|---|---|
| 2536360 | 2/1976 | Fed. Rep. of Germany | 55/261 |
| 13823 | 7/1978 | U.S.S.R. | 55/459 R |

*Primary Examiner*—David L. Lacey

*Attorney, Agent, or Firm*—Kerkam, Stowell, Kondracki & Clarke

[57] ABSTRACT

Cyclone separator for separating solid particles from particle laden gas having an outlet pipe assembly which includes a pair of co-axial outlet pipes radially spaced apart from each other to form an annular passage therebetween. A plurality of accelerating air supplying nozzles are provided around the outer pipe of the outlet pipe assembly. A blower is provided to supply air under pressure to the annular passage and the nozzles. The air under pressure is discharged from the nozzles along the outer surface of the outlet pipe assembly in the same direction as that of a spiral downward flow of particle laden gas thereby accelerating the spiral downward flow and disturbing the outer surface of the outlet pipe assembly to prevent formation of a boundary layer. The air under pressure is also discharged from the annular passage to blow down the outermost portion of a spiral upward gas flow in the outlet pipe assembly which includes a substantial part of particles contained in the spiral upward flow, so that only the central portion of the spiral upward gas flow containing a less amount of particles is exhausted through the inner pipe of the outlet pipe assembly.

4 Claims, 3 Drawing Figures

CYCLONE SEPARATOR

This invention relates to cyclone separators for separating solid particles from particle laden air or gases.

Conventional cyclone separators generally include a separating tower to which particle laden gas is introduced from an upper portion thereof tangentially and downwardly to form a spiral downward flow substantially along the inner wall surface of the separating tower. The spiral flow of gas is turned in its direction of flow in the vicinity of the bottom of the separating tower and is caused to flow spirally upwardly substantially along the vertical center portion thereof. In the course of the spiral downward movement of the gas, solid particles are separated from the spiral flow of gas under the influence of centrifugal force and accumulate at the bottom portion of the tower until they are taken out. Thus, the spiral upward flow of gas along the vertical center portion of the separating tower contains less amount of solid particles. Therefore, the separating tower is provided at its upper portion with an outlet pipe disposed substantially coaxially with the tower so as to allow only the spiral upward flow to flow out of the tower. The outlet pipe is generally extended downwardly from the upper end of the separating tower for a certain distance to prevent the particle laden incoming flow from entering the outlet pipe.

In the conventional cyclone separators as mentioned above, however, fine particles cannot be perfectly separated so that the gas exhausted through the outlet pipe inevitably includes particles to some extent. The reason for this is considered to be: (1) it is difficult to perfectly separate extremely minute particles only by means of centrifugal force; and (2) a boundary layer is formed along the outer surface of the outlet pipe to substantially decrease the speed of the downward gas flow in the immediate vicinity of the outlet pipe. Thus, the particles in the vicinity of the outer surface of the outlet pipe are not entrained by the spiral downward flow of the incoming gas but are allowed to fall downwardly apart from the spiral downward flow and are then blown up by the spiral upward flow into the outlet pipe, thereby adversely increasing the particle content of the discharged gas.

In order to overcome the above problems, an improved cyclone separator has been proposed by Japanese Utility Model Application Sho No. 49-968254 laid open for public inspection as Utility Model Public Disclosure Sho No. 51-25272 on Feb. 24, 1976 and commonly assigned U.S. patent application Ser. No. 605005 titled "Cyclone Separator" filed on Aug. 15, 1975 now abandoned, but refiled as commonly assigned U.S. patent application Ser. No. 051,139. The cyclone separator includes an outlet pipe constituted of a plurality of coaxial outlet pipe elements, means provided for supplying spiral downward flow to the annular space between each pair of adjacent outlet pipe elements, and accelerating air supplying means provided in an inlet pipe to discharge accelerating air in the direction of inlet gas flow.

The gas entering into the outlet pipe contains fine solid particles which have not been centrifugally separated in the course of the spiral downward movement of the particle laden gas, and the particle concentration in the outlet pipe is highest at the area along the inner surface of the outlet pipe and decreases toward the center portion of the outlet pipe. Thus, the spiral downward flow supplied through the space between each pair of adjacent outlet pipe elements serves to blow down the outermost portion of the spiral upward flow which includes a substantial part of the fine particles contained in the upward flow of gas, so as to return them to the separating tower. As a result, only the central portion of the spiral upward flow of gas which has a smaller particle concentration than the mean particle concentration of the overall spiral upward flow of gas is exhausted through the outlet pipe, whereby the separation efficiency is improved.

Furthermore, the accelerating air supplying means in the inlet pipe acts to accelerate the particle laden air introduced from the inlet pipe into a separating chamber thereby increasing the centrifugal force of the spiral downward flow of gas in the separating chamber. The increased centrifugal force is effective in increasing the separation efficiency.

However, the accelerating air supplying means in the inlet pipe could not sufficiently prevent formation of a boundary layer on the outer surface of the outlet pipe. Because of this, the incoming gas of high particle concentration introduced from the inlet pipe and falling down in the boundary layer is unavoidably entrained to some extent by the spiral upward flow at the inlet of the outlet pipe without being subjected to the separating effect of the spiral downward flow. Therefore, although only the central portion of the spiral upward gas flow in the outlet pipe, having a relatively small particle concentration, is exhausted through the innermost pipe element of the outlet pipe, since the absolute amount of the particles contained in the upward gas flow in the outlet pipe cannot be sufficiently decreased because of the boundary layer, the separation efficiency is limited in the device as disclosed in the aforementioned applications.

Therefore, an object of this invention is to provide a cyclone separator with further improved particle separation efficiency.

According to this invention, the above and other objects can be accomplished by a cyclone separator which comprises a separating tower defining a separating chamber therein, and inlet means for introducing particle laden gas into the separating chamber from its upper portion in such a manner that the introduced gas forms a spiral downward flow along an inner wall surface of the separating tower and then it is turned in its direction of flow to form a spiral upward flow substantially along a center portion thereof. The cyclone separator also comprises an outlet pipe assembly provided to extend downwardly in the upper central portion of the separating tower and constituted of at least two co-axial outlet pipes radially spaced apart from each other to form an annular passage therebetween. Means is provided for producing downward gas flow in the annular passage between each pair of adjacent outlet pipes. Accelerating air supplying nozzle means is also provided around the outlet pipe assembly to discharge accelerating air along the outer surface of the outlet pipe assembly in the rotational direction of the spiral downward gas flow.

With the above construction, the accelerating air flow discharged from the nozzle means along the outer surface of the outlet pipe assembly acts not only to accelerate the spiral downward flow of the particle laden gas in the separating chamber so as to increase the centrifugal force of the spiral downward flow, but also to disturb the outer surface of the outlet pipe assembly so as to perfectly prevent the formation of a boundary layer. Therefore, the separation capability of the spiral downward gas flow is increased by the increase of the centrifugal force. Also, since no boundary layer is formed around the outer surface of the outlet pipe assembly, all the incoming gas of high particle concentration is entrained by the spiral downward gas flow and is made safe from falling down along the outer surface of the outlet pipe assembly and then from being entrained by the spiral upward flow at the inlet of the outlet pipe assembly without being subjected to the separating effect of the spiral downward flow. Therefore, since the spiral upward gas flow enters the outlet pipe assembly without entraining the incoming gas of high particle concentration, the absolute amount of the particles contained in the upward gas flow in the outlet pipe assembly can be decreased to the limit achieved by the separating effect of the spiral downward gas flow.

Furthermore, the spiral downward flow of gas supplied through the annular passage between each pair of adjacent outlet pipes serves to blow down the outermost portion of the spiral upward gas flow which includes a substantial part of the particles contained in the upward flow of gas, thereby returning them to the separating tower for another separation. Therefore, only the central portion of the spiral upward gas flow which has less amount of particles is exhausted through the outlet pipe assembly.

Thus, separation efficiency is increased, as compared with that obtained in the cyclone separator as disclosed in the aforementioned application.

The above and other objects and features of this invention will become apparent from the following descriptions of a preferred embodiment with reference to the accompanying drawings, in which.

Figure 1:
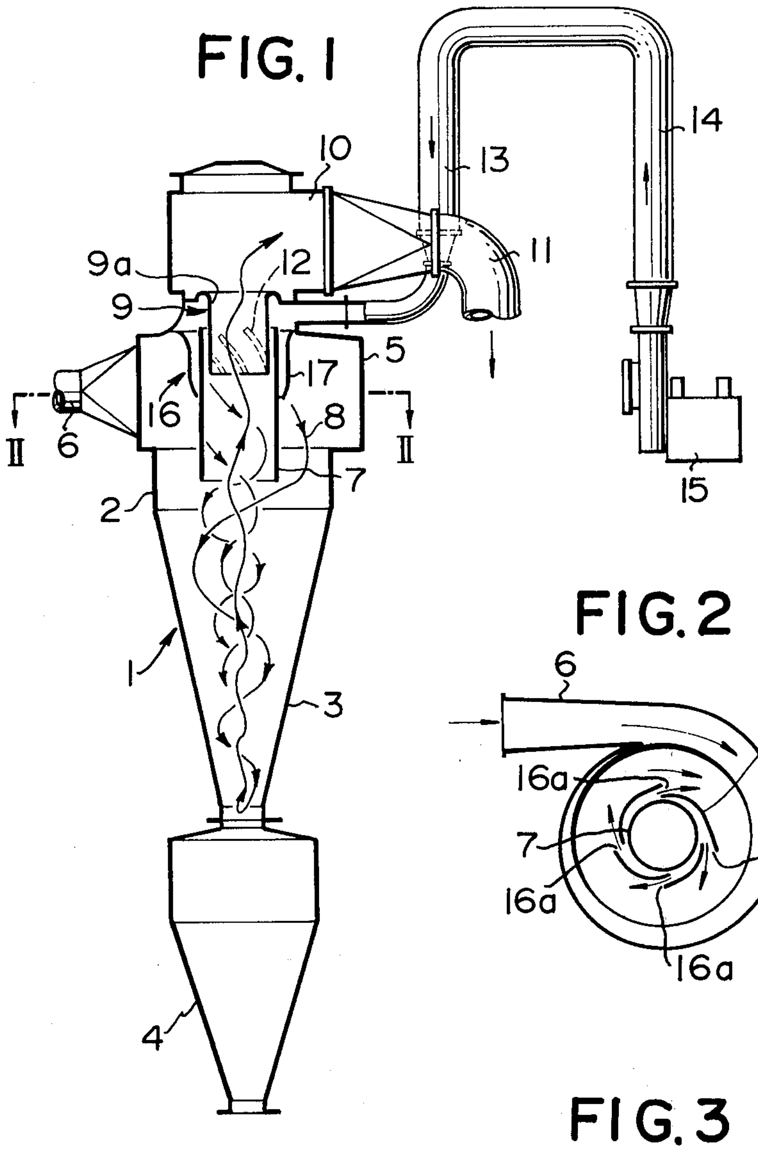
FIG. 1 is a vertical sectional view of one embodiment of the cyclone separator in accordance with this invention.
Figure 2:
FIG. 2 is a sectional view taken substantially along the line II—II in FIG. 1.

Referring now to FIGS. 1 and 2, there is shown a cyclone separator in accordance with this invention which includes a separating tower 1 of substantially inverted frustoconical configuration having a cylindrical upper portion 2 and a conical lower portion 3 and defining a separating chamber therein. The lower end of the separating tower 1 is connected with a particle collecting chamber 4. At the upper end of the separating tower 1, there is provided an inlet chamber 5 which has an inlet passage 6 disposed tangentially of the inlet chamber 5 as shown in FIG. 2. There is also disposed a cylindrical outlet pipe 7 which extends downwardly and vertically through a central portion of the inlet chamber 5 near to a lower end of the cylindrical portion 2 of the separating tower 1.

As is well known in the art of cyclone separators, particle laden gas is introduced from the inlet passage 6 tangentially into the inlet chamber 5 and then is directed spirally downwardly along the inner wall surface of the separating tower 1 to form a spiral downward flow of gas as shown by arrows 8 in FIG. 1. At the lower portion of the separating tower 1, the flow of gas is turned upwardly to form a spiral upward flow along the center portion of the separating tower 1. At the upper portion of the separating tower 1, the spiral upward flow is introduced into the outlet pipe 7. During this process, the solid particles in the gas are separated from the gas under the influence of the centrifugal force of the spiral gas flow fall down along the inner wall surface of the separating tower 1 to be collected in the particle collecting chamber 4.

In the above mentioned construction, according to this invention, there is provided an auxiliary outlet pipe assembly 9 located co-axially in the outlet pipe 7 radially apart from the outlet pipe 7 by a short distance to form an annular passage therebetween. In the shown embodiment, the auxiliary outlet pipe assembly 9 includes one auxiliary outlet pipe *9a* as shown in FIG. 1. But, the auxiliary outlet pipe assembly 9 may include a plurality of co-axial auxiliary outlet pipes, for example, a pair of co-axial auxiliary outlet pipes *9a* and *9b* as shown in FIG. 3, spaced radially apart from one another by a short distance to form an annular passage between each pair of adjacent auxiliary outlet pipes.

Figure 3:
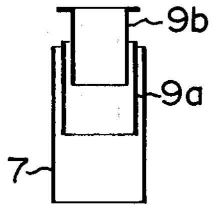
FIG. 3 is a partial vertical sectional view showing a modification of the outlet pipe assembly of the cyclone separator shown in FIG. 1.

The auxiliary outlet pipe *9a* or the innermost pipe of the auxiliary outlet pipe assembly (the auxiliary outlet pipe *9b* in the modified embodiment of FIG. 3) is in communication at its upper end with an outlet chamber 10 which is in turn connected with an outlet duct 11. In the annular passage between the outlet pipe 7 and the auxiliary outlet pipe *9a* there are disposed a plurality of spiral guide vanes 12 and a blower 15 is provided so as to supply air under pressure into the annular passage through ducts 13 and 14. If the auxiliary outlet pipe assembly includes a plurality of auxiliary outlet pipes, there are preferably provided a plurality of spiral guide vanes (not shown) in the annular passage between each pair of adjacent auxiliary outlet pipes.

With the shown arrangement, a spiral downward flow of air under pressure is discharged through the annular passage between the outlet pipes 7 and *9a* along the inner surface of the outlet pipe 7. In order to avoid disturbance of the spiral upward gas flow which has entered into the outlet pipe 7, the guide vanes are preferably directed to discharge air under pressure in the same direction as the rotational direction of the spiral upward gas flow.

Also according to this invention, there is provided accelerating air supplying nozzle means 16 located on the upper outer surface of the outlet pipe 7. For example, the nozzle means 16 is constituted of a cylindrical member 17 located to co-axially surround the outlet pipe 7. The cylindrical member 17 has an upper portion in flow communication with the duct 13 and a reduced lower portion having a plurality of vertical slots cut at equal intervals on the circumference thereof to form nozzle ports *16a* as shown in FIG. 2. In the shown embodiment, four nozzle ports *16a* are provided around the outlet pipe 7 at equal intervals. The nozzle ports *16a* are directed to discharge air under pressure in the same direction as the rotational direction of the spiral downward flow of the particle laden gas introduced from the inlet passage 6. Preferably, the nozzle ports *16a* are directed in such a downward inclined direction as to discharge air under pressure in the direction of the spiral downward gas flow.

With the above mentioned construction, air under pressure discharged from the nozzle means 16 acts to accelerate the spiral downward flow of the particle laden gas introduced from the inlet passage 6 so as to increase the centrifugal force of the spiral downward flow in the separating chamber, and also to disturb the outer surface of the outlet pipe 7 so as to perfectly prevent formation of a boundary layer. As a result, the amount of the particles falling down along the outer surface of the outlet pipe because of the boundary layer is greatly decreased so that substantially all particles contained in the incoming gas are entrained by the spiral downward gas flow.

Furthermore, the gas introduced from the separating tower 1 into the outlet pipe 7 contains fine particles which have not been centrifugally separated from the spiral gas flow in the separating tower 1. Such fine particles normally flow upwardly substantially along the inner surface of the outlet pipe 7 because of the centrifugal force. The air under pressure supplied from the blower 15 through the ducts 13 and 14 is discharged from the passage between the outlet pipe 7 and the auxiliary outlet pipe **9*a* to form a spiral downward flow along the inner wall surface of the outlet pipe 7. The spiral downward flow of air along the inner surface of the pipe 7 serves to blow down the outermost portion of the spiral upward gas flow which includes a substantial part of the particles contained in the spiral upward gas flow in the outlet pipe 7, and to return them back to the separating tower 1** for another separation.

in order to enhance the blow-down effect, it is preferable to provide a plurality of co-axial auxiliary outlet pipes adapted such that the lower end of the inner auxiliary outlet pipe of each pair of adjacent inner and outer auxiliary outlet pipes is at a level higher than that of the lower end of the outer auxiliary outlet pipe so that the blowing ports of the annular passages become higher in level from the outermost to the innermost. For example, in the embodiment having the auxiliary outlet pipe assembly as shown in FIG. 3, since the particle concentration of the spiral upward gas flow in the outlet pipe 7 becomes high from the central portion toward the inner wall surface of the outlet pipe, the outermost portion of the spiral upward gas flow containing the largest amount of particles can be first blown down to the separating tower 1 by the air under pressure discharged from the passage between the outlet pipe 7 and the outer auxiliary outlet pipe **9*a*, and then, the portion inwardly next to the outermost portion of the spiral upward gas flow and having a substantial part of the particles still contained in the spiral upward gas flow in the outlet pipe is blown down to the separating tower 1 by the air under pressure discharged from the outer and inner auxiliary outlet pipes 9*a* and 9*b***. Therefore, it should be noted that, in order to substantially completely blow down the particles contained in the spiral upward gas flow, the number of the pipes of the auxiliary outlet pipe assembly can be increased to increase the number of the blow-down streams if necessary.

A flow resistance device may be provided between each pair of adjacent outlet pipes to selectively decrease the speed of the blow-down air flow so that the speed of the spiral blow-down air flow is higher in the inner annular passage than in the outer annular passage so as to effectively blow down the particles.

Furthermore, the separation efficiency is further enhanced by adjusting the discharged amount of air from the annular passage between each pair of adjacent outlet pipes and from the accelerating air supplying nozzle means 16. In this case, air supplying piping for the annular passage may be made separate from the piping for the nozzle means 16.

This invention has thus been shown and described with reference to specific embodiments. However, it should be noted that the invention is in no way limited to the details of the illustrated structures but changes and modifications may be made without departing from the scope of the appended claims.

We claim:

1. A cyclone separator which includes a separating tower defining a separating chamber therein, inlet means for introducing particle laden gas into the separating chamber at an upper portion thereof in such a manner that the introduced gas forms a spiral downward flow along an inner wall surface of the separating tower and then it is turned in its direction of flow to form a spiral upward flow substantially along a center portion thereof, and outlet pipe means disposed in the upper portion of the separating chamber for allowing the spiral upward flow of gas to pass therethrough said outlet pipe means comprising at least two co-axial outlet pipes radially separated from each other to form an annular passage therebetween, said annual passage being connected to a pressurized gas supplying means for producing a downward flow in said annular passage to blow down the outermost portion of the spiral upward in said outlet pipe means to said separating chamber, and accelerating gas ejecting means provided on the outer surface of an upper portion of the outermost pipe of said outlet pipe means and connected to said pressurized gas supplying means to discharge accelerating gas along the outer surface of said outermost outlet pipe means in the same direction as the rotational direction of the spiral downward flow while disturbing the outer surface of said outermost outlet pipe means to prevent formation of a boundary layer on the outer surface of said outermost outlet pipe means.

2. A cyclone separator as set forth in claim 1 in which said accelerating gas ejecting means is positioned to direct said flow of accelerating gas in the same direction as that of the spiral downward flow.

3. A cyclone separator as set forth in claim 1 or 2 in which said accelerating gas ejection means includes a plurality of nozzles located on the outer surface of the upper portion of said outermost outlet pipe at equal intervals in the circumferential direction.

4. A cyclone separator as set forth in claim 1 further including spiral guide vanes disposed in the annular passage between each pair of adjacent outlet pipes to generate a spiral downward flow.

* * * * *

UNITED STATES PATENT AND TRADEMARK OFFICE
CERTIFICATE OF CORRECTION

PATENT NO. : 4,257,786

DATED : March 24, 1981

INVENTOR(S) : Yukio Sogo, Kazuo Ido, Kozo Taneda, Katzuji Sakai & Yoichiro Sato

It is certified that error appears in the above-identified patent and that said Letters Patent are hereby corrected as shown below:

Column 6, Claim 1, line 34, after "ward" and before "in", insert the word "flow"

Signed and Sealed this

*Second* Day of *June 1981*

[SEAL]

*Attest:*

RENE D. TEGTMEYER

*Attesting Officer* *Acting Commissioner of Patents and Trademarks*